United States Patent

[11] 3,619,263

[72] Inventors Edward R. Bremer
St. Paul, Minn.;
Robert M. Ripple, San Francisco, Calif.
[21] Appl. No. 784,482
[22] Filed Dec. 17, 1968
[45] Patented Nov. 9, 1971
[73] Assignee Chevron Research Company
San Francisco, Calif.

[54] COATING OF ORE PELLETS WITH BITUMINOUS EMULSIONS
6 Claims, No Drawings
[52] U.S. Cl. .................................................. 117/100 B,
75/4, 117/100 M, 117/168
[51] Int. Cl. .......................................................... C21b 1/00,
C22b 1/00
[50] Field of Search ............................................ 117/100,
168; 75/4

[56] References Cited
UNITED STATES PATENTS

| | | | |
|---|---|---|---|
| 2,481,374 | 9/1949 | Watts et al. .................... | 75/4 X |
| 2,626,875 | 1/1953 | McConnaughay ........... | 117/100 |
| 2,793,139 | 5/1957 | Grunewald .................... | 117/100 |
| 2,869,850 | 1/1959 | Wienert ......................... | 75/4 X |
| 2,999,762 | 9/1961 | Verdier ......................... | 117/100 X |
| 3,041,161 | 6/1962 | Heinz et al. .................... | 75/4 X |

*Primary Examiner*—William D. Martin
*Assistant Examiner*—Mathew R. P. Perrone, Jr.
*Attorneys*—A. L. Snow, F. E. Johnston, B. I. Rowland and J. Tedd Brooks

ABSTRACT: Process for protecting ore pellets from abrasive degradation by coating them with a bituminous emulsion in an amount sufficient to deposit on the pellet surfaces from 0.1 to 0.3 percent by weight relative to the pellets of a protective coating.

COATING OF ORE PELLETS WITH BITUMINOUS EMULSIONS

BACKGROUND OF THE INVENTION

1. Field of the Invention

Large quantities of metallic ores have been mined and prepared for shipping by induration into the form of ore pellets. These pellets are shipped from plants located near the ore sources to the mills where the pellets are used to feed open hearth and blast furnaces for reduction into metals, etc. While many ores have been so treated, and are of significant importance, for example, chromium, vanadium, ores, etc., the most important material of this type in commerce has been taconite ore. Vast quantities of this material, consisting primarily of chert, a form of silica, and of magnetite, a black, magnetic iron mineral, exist in huge deposits in Minnesota and Michigan in the United States, and elsewhere in the world. Because of the long distances from the ore beds to the steel mills, the process of separation of the iron-containing part of the taconite, its concentration and agglomeration into pellets and the shipment to the steel mills have acquired great economic significance.

The processes of pellet manufacture from various mineral ores have certain basic similarities, and taconite pellet production is simply illustrative. While some steps are peculiar to the taconite process, primarily magnetic separation of the ore fines, the differences have minimal influence upon the character of the final product, the pellets. Thus the basic process in taconite pellet production includes the steps of removing the ore from the ground, processing it into a fine powder in rod and ball mills, etc. and removing the magnetite by means of magnetic separators and discarding silica and other impurities. The concentrated magnetite is then rolled into balls with clay or other binders and then baked in furnaces at high temperatures (from 1,000°–2,400° F.) to form hard iron ore pellets. Many variations may be made in the procedure: binders of various types may be employed, temperature variations, etc. may be made. The finished pellets will usually have an average diameter range of from three-eighth inch to one-half inch.

After the mined ore is treated and pelletized, and the pellets leave the furnaces at extremely high temperatures, they are transported to loading docks and loaded into either ships or railroad cars for final transportation to steel mills. During this initial transfer operation a serious problem arises. Due to the somewhat friable and abrasive nature of the pellets, when they are transported in a usual manner on a conveyor belt or dropped into storage piles, abrading of the pellets against one another causes pellet breakage and the formation of large amounts of dust. The dust causes serious air-pollution problems. In addition, because of the sheer volume of the taconite shipments, totaling more than 21 million tons in the United States in 1966, the loss of ore in the form of dust represents a serious economic loss, as 2–3 percent by weight of the treated ore is estimated to be lost as dust.

Attempts have been made to alleviate the dusting problem with water sprays, and while the amount of dusting has been significantly reduced with this method, the application of water to the pellets has caused new problems to arise. First, since shipping is done on a weight basis, an increase in the moisture content of the pellets results in the shipment of large quantities of water for long distances. Secondly, when relatively large quantities of water are present in the pellets during storage and transport, due to the low winter temperatures in the northern regions of the United States where most of the taconite plants are located, freezing causes the pellets to stick together in storage and in transport, making loading difficult or impossible during certain times of the year.

2. Description of the Prior Art

U.S. Pat. No. 3,041,161 discloses a process of pelletizing metallic ore by commingling ore fines and a soft asphalt emulsion, followed by baking of the pellets at a temperature of 400°–600° F. Also disclosed is the process of strengthening the pellets by coating them with a cut-back of a high penetration asphalt and evaporating the cut-back solvent whereby an asphalt coating of from 0.1–5 percent by weight of the pellets is absorbed in the outer volume of the pellets.

U.S. Pat. No. 2,869,850 discloses a method of coating pelletized ores prior to heat treatment in order to protect the ore material from the kiln atmosphere. Coatings which are used include waterglass, molasses, glucose, or warm tar.

SUMMARY OF THE INVENTION

It has now been found that greatly improved resistance to abrasive degradation and consequent weight loss of metallic ore pellets can be achieved by coating the pellets at a temperature not exceeding 750° F. with from about 0.05–0.4 percent by weight solids relative to the pellet weight with a water emulsion of a bitumen, the bitumen having an ASTM-D-5-65 penetration at 77° F. of from 0-100, more preferably, 0-50, and most preferably, 0-5. The preferred coating range is from 0.1 to 0.3 percent by weight relative to the weight of the pellets. The emulsion will contain from about 1 to 80 percent by weight solids.

DESCRIPTION OF THE PREFERRED EMBODIMENTS

The bitumens which are suitably employed in the invention include various asphalt residuals, airblown asphalts, solvent extracts, coal tar-pitches, solvent deasphalter products, gilsonite, etc. The critical feature lies in the hardness of the material. Low penetration materials (0–5 at 77° F.) are preferable, although satisfactory performance can be obtained with somewhat softer materials having penetrations as high as 100.

The emulsions which are effective in the process of this invention, include those prepared with cationic, anionic, or nonionic emulsifiers.

Examples of the cationic emulsifiers include salts of fatty amines such as tallow 1–3 propylene diamine salt and the quaternary ammonium salts such as diethyl methyl dodecyl ammonium chloride.

Examples of nonionic emulsifiers which may be employed in the process of this invention include esters of alcohols such as the glycol mono-, di- and trilaurates, ethoxylated materials such as the ethoxylated salts of nonyl phenol and ethoxylated derivatives of fatty acids and their derivatives, e.g., ethoxylated stearyl amine, ethoxylated stearic acid and ethoxylated stearoacetanide, etc.

Included among the suitable anionic emulsifiers are soaps of fatty acids such as the sodium, potassium salts of oleic acid, tall oil; salts of naphthenic acids and oxidized fatty acids, rosin soaps, proteins such as casein, procein, etc. Also suitable are the salts of hydrocarbyl sulfonic, and sulfuric acids, lignin sulfuric acids, salts of ligninaminosulfonic acid, etc.

An example of the preferred emulsifiers which may be employed with the hard asphalts are the anionic alkali metal salts of solvent-extracted pinewood resin. Emulsions containing these agents have found particular application in paper sizing. U.S. Pat. No. 2,481,374 describes the emulsions which have found advantageous application in the process of the instant invention.

Although the pinewood resin salts are the preferred emulsifiers for the emulsions of this invention, other materials for the emulsions of this invention, other materials may be suitably employed. For example, clays such as bentonite and cationic emulsifiers such as quaternary ammonium salts may be employed. The emulsions are prepared in a conventional manner, generally employing a colloid mill.

Various methods may be used to coat the pellets. While the amount of coating that is to be applied is critical within certain limits, the particular method of application which is used to achieve the coating is not critical, and various effective means are known in the art. A common way of coating is to apply a direct spray to the pellets; however, many variations are possible in conducting the stream of pellets through the spray. Thus the pellets may be sprayed while they are dropping in a free-falling stream, on a rotating disc, on an incline plate, in a rotating drum, in a ribbon mixer, or in a pug mill. Alternatively, a conveyor (belt) carrying the pellets may be passed through a bath of the emulsion, or the stream of pellets may be directed through a curtain coater, either in supported or unsupported fashion.

The pellets leaving the furnace will be at quite high temperatures, generally at least 1,000° F. The emulsions should be applied when the pellets are at temperatures of not more than 750° F., as coking of the asphalt occurs at high temperatures. More preferably the pellets will be at temperatures in the range of 200° to 600° F. It is also preferred that the pellets, if they are coated at a temperature above 400° F., be cooled to 400° F. or less within a period of not more than 24 hours. Although the pellets may be coated at temperatures less than 300° F., e.g., as low as 200° F., in most instances the full effect of abrasion reduction and consequent dust reduction may be achieved when the pellets are at a temperature sufficiently low to coat, i.e., less than 750° F.

A series of examples show the improved characteristics of the bituminous emulsion coated pellets.

In the testing of the abrasion characteristics of the pellets, it is necessary to employ a test which simulates the impact and abrading conditions which occur during the final stages of plant production of the mineral ore pellets. The following test duplicating plant conditions was employed.

quantity of solids actually applied. The spraying operation is repeated, if necessary to attain the selected application rate.

4. The beaker containing the coated pellets is returned to the oven for a predetermined period of time simulating the period for which a large mass of pellets in the plant storage retains considerable heat and will be referred to subsequently as "oven storage" time.

5. After a predetermined period of oven storage, the coated pellets are abraded (while still hot) by placing them immediately in an 8 inch diameter, ¼ inch round-hole sieve with a collecting pan underneath. A lid is placed on top of the sieve. This assembly is placed immediately in the lowest position of a Denver Sieve Shaker; two additional sieves are placed on top of the assembly to serve as spacers and permit their secure fastening in the sieve shaker. The sieve shaker is then operated for a set time (10 or 15 minutes).

6. The assembly is removed from the sieve shaker. Dust which has collected in the pan is screened through a No. 16 sieve and weighed.

In order to determine the effectiveness of the asphalt emulsions in reducing abrasion loss of taconite pellets, a series of emulsions were prepared employing various emulsifiers and asphalt bases. The compositions of the various materials may be found in the following table:

TABLE I.—EMULSION COMPOSITIONS

| Emulsion | Asphalt type | Asphalt | Vinsol resin [1] | Bentonite clay | Sodium hydroxide | Water | Other additives |
|---|---|---|---|---|---|---|---|
| A | San Joaquin Valley air-blown asphalt (0 penetration, 242° F. MP). | 55.00 | 2.00 | 0.50 | 0.30 | 42.20 | |
| B | Venezuelan Boscan air-blown asphalt (0 penetration, 220–225° F. MP). | 55.00 | 2.31 | 0.58 | 0.27 | 41.84 | |
| C | Asphalt pitch (0 penetration, 190° F. MP) | 56.00 | 1.50 | 0.40 | 0.28 | 41.82 | |
| D | Asphalt residuum (0 penetration, 200–225° F. MP). | 55.00 | 2.40 | 0.58 | 0.40 | 41.62 | |
| E | Farmer's Union central exchange pitch (0 penetration, 220–230° F. MP). | 55.00 | 2.31 | 0.58 | 0.27 | 41.84 | |
| F | Wyoming steam-reduced asphalt pitch (0 penetration, 182° F. MP). | 56.00 | 1.50 | 0.40 | 0.28 | 41.82 | |
| G | Cracked tar (0 penetration, 190° F SP). | 55.50 | 2.00 | 0.65 | 0.40 | 41.45 | |
| H | Steam-reduced crude residuum (0 penetration, 190° F. SP). | 53.50 | 2.00 | 0.65 | 0.40 | 43.45 | |
| I | Solvent deasphalter bottoms (0 penetration, 190–195° F. MP). | 53.50 | 2.00 | 0.65 | 0.40 | 43.45 | |
| J | Eastern asphalt pitch (0 penetration, 170–180° F. SP). | 41.00 | | | | 49.94 | [2] 9.00<br>[3] 0.01<br>[4] 0.05 |
| K | Western steam-reduced paving asphalt (50–60 penetration). | 55.89 | 2.13 | 0.30 | 0.32 | 41.36 | |
| L | Western steam-reduced paving asphalt (50–60 penetration). | 48.21 | | 3.00 | | 48.70 | [3] 0.00<br>[5] 0.04<br>[9] 0.04 |
| M | Coal tar pitch (0 penetration, 110–150° F. SP). | 35.34 | | | | 44.20 | [2] 16.00<br>[5] 4.12<br>[6] 0.19 |
| N | Western steam-reduced paving asphalt (50–60 penetration). | 55.89 | 2.13 | 0.30 | 0.320 | 41.36 | [7] 0.05 |

[1] A pinewood derivative.
[2] Mississippi clay.
[3] Ferric chloride.
[4] Quarternary ammonium salt manufactured by Nalco Chemical company.
[5] Silica flour.
[6] Formonyte 802—tallow-1,3-propylene diamine.
[7] Potassium hydroxide.
[8] Barium chloride.
[9] Ammonium chloride.

METHOD OF APPLICATION AND ABRASION TEST

1. Five hundred grams of pellets from mill production are weighed into a tared 16-oz. stainless steel beaker.

2. The beaker is placed in a forced-draft oven regulated to a predetermined temperature and conditioned in the oven for not less than 1 hour.

3. The heated pellets are removed from the oven and quickly placed into a 10 inch coarse mesh kitchen colander used as mixing pan. The pellets are sprayed immediately with a dilution of the asphalt emulsion under test; the proportion of emulsion and water are such that the dilution contains 10% by weight solids. During spraying, the pan is swirled to expose all pellets as uniformly as possible. Coated pellets are transferred to the tared 16-oz. beaker for reweighing to determine the The emulsions described in the above table were sprayed onto taconite pellets at a concentration sufficient to yield residual 0.4 percent by weight asphalt coating on the pellets. The spraying was accomplished at a temperature of 750° F. Following the coating, the pellets were placed in an oven and subjected to temperatures ranging from 200°–750° F. for various periods. This substantially duplicates the periods of storage at elevated temperatures which occur in actual production. Following the storage the pellets were abraded as previously described, and the percent weight loss was determined. In some instances the pellets after the first abrasion were returned for a second storage period and again abraded. The combined weight loss of the two periods is given in the table following.

TABLE II.—ABRASION TESTS OF TACONITE PELLETS

| | 10-minute abrasion for 500 gm. coated pellet samples postcured | | | | | | | | |
|---|---|---|---|---|---|---|---|---|---|
| | A | B | C | D | E | F | G | | H |
| Emulsion coating on pellets | 24 hr. at 200° F., gm. | 1½ hr. at 400° F., gm. | 72 hr. at 400° F., gm. | B+C gm. | 24 hr. at 400° F., gm. | 1½ hr. at 600° F., gm. | 24 hr. at 600° F., gm. | E+F, gm. | 24 hr. at 600° F., gm. | 1½ hr. at 750° F., gm. |
| A | 3.79 | 3.95 | 3.49 | 7.44 | 4.54 | 2.98 | 2.12 | 5.10 | 3.82 | 3.59 |
| B | | 0.22 | 1.13 | 1.35 | 0.60 | 1.36 | 4.72 | 6.08 | 4.48 | |
| C | 0.23 | 0.53 | 1.89 | 2.42 | 0.23 | 0.48 | 1.88 | 2.36 | 1.90 | 1.80 |
| D | | 0.68 | 1.60 | 2.28 | 0.51 | 0.90 | 3.00 | 3.90 | 1.77 | |
| E | | 0.56 | 1.45 | 2.01 | 0.47 | 2.86 | 5.20 | 8.06 | 2.80 | |
| F | | 0.53 | 1.88 | 2.41 | 1.30 | 1.56 | 4.72 | 6.22 | 2.65 | |
| G | | 0.16 | 0.97 | 1.13 | 1.36 | 0.88 | 6.14 | 7.02 | 2.31 | |
| H | 0.80 | 0.67 | 0.84 | 1.51 | 0.53 | 0.68 | 2.12 | 2.80 | 2.15 | 1.71 |
| I | | | 1.08 | | 0.63 | 1.32 | 3.28 | 4.60 | 3.24 | |
| J | | 0.53 | 0.90 | 1.43 | 1.02 | 1.80 | 4.34 | 6.14 | 2.96 | |
| K | | 2.00 | 2.57 | 4.57 | 1.87 | 1.04 | 1.51 | 2.55 | 1.86 | |
| L | | | 0.52 | | 0.59 | 3.22 | 5.92 | 9.13 | 4.89 | |
| M | | 0.35 | 2.44 | 2.79 | 0.96 | 0.28 | 1.46 | 1.74 | 4.95 | 1.51 |
| N | | 0.12 | 0.93 | 1.05 | 0.68 | 1.06 | 2.72 | 3.78 | 2.38 | |
| | | 0.79 | 2.36 | 3.15 | 1.01 | 0.90 | 1.82 | 2.72 | 3.53 | |

These data show clearly the effectiveness of the asphalt emulsion in reducing abrasion loss of the metallic ores. It may be noted that emulsion produced from the quaternary-clay composition was not so effective as the pinewood resin-emulsified materials in reducing abrasion loss; however, this coating still produced a significant reduction compared with the uncoated pellets.

In order to determine the effect of nonasphaltic coatings in reducing abrasion on the metallic ore pellets, three nonasphaltic materials were applied at 0.4 percent by weight residual solid and abraded for 10 minutes. The results of the test are described in the following table.

TABLE III.—NONASPHALTIC SPRAY COATINGS ON TACONITE PELLETS AS ANTIDUSTING AGENTS

| | 10-minute abrasion for 500-grams coated pellet samples postcured | |
|---|---|---|
| Coating on pellets [1] | 24 hours at 400° F., gram | 24 hours at 600° F., gram |
| None | 2.03 | 2.07 |
| Water-based acrylic latex coating | 1.37 | 1.93 |
| Emulsified wax/ethylene, vinyl acetate copolymer (75% wax, 25% copolymer emulsified with 3% each stearic acid, polyethoxy sorbitan and triethanolamine) | 1.49 | 1.63 |
| Sodium silicate solution (41° Baumé, 40% solids) | 1.98 | |

[1] Coatings were sprayed on pellets heated to 750° F. Residual coatings on pellets were 0.4% by weight.

It may be seen that the weight loss was only nominally reduced by the materials applied.

In order to demonstrate the surprising effectiveness of the emulsions compared with cut-back asphalt, back-to-back comparisons were made with emulsions and cut-backs, and the coated taconite pellets were tested. The cut-backs were prepared with a typical hydrocarbon asphalt solvent. The emulsions were made with the pinewood resin emulsifier previously described. These data may be found in the following table.

TABLE IV

| | | Wt. % Dust in Denver Shaker Test, 10 Min. | |
|---|---|---|---|
| Coating 0.2% by Weight Residue | Asphalt Pen. | Pass No. 16 Screen | Pass No. 325 Screen |
| 1 None | | 0.40 | 0.37 |
| 2 Emulsion of Hard Asphalt Air-blown Pitch) | 3 | 0.03 | 0.02 |
| 3 Cutback of Hard Asphalt (Air-blown Pitch) | 3 | 0.08 | 0.06 |
| 4 Emulsion of Med.Pen. Asphalt | 85–100 | 0.12 | 0.04 |
| 5 Cutback of Med.Pen. Asphalt | 85–100 | 0.31 | 0.20 |

As can be seen from these data the emulsion of a very low penetration asphalt (3) was about three times as effective in reducing dusting as the cut-back of the same asphalt. The emulsion of a medium penetration asphalt (85–100) was about four times as effective in reducing dusting than the cut-back of the same asphalt. Additional figures showed in comparing examples 1 and 2 that the dust (passing 325 mesh screen) from the emulsion-coated pellets contain 5.4 percent carbon, the dust from the pellets coated with cut-back, 3.7 percent, and the uncoated pellets contain 0.60 percent, This indicates that there is a lower loss of iron ore from the emulsion-coated materials.

An additional advantage shown to result from the coating of the ore pellets with asphalt emulsions is in an increased resistance to breakage resulting from handling of the pellets or a thermal shock. In the blast furnaces it is desired that the pellets have a certain minimum diameter, as it has been found that smaller materials are ejected from the top of the furnace by the air draft.

In the following test, rough handling was simulated by dropping the pellets 12' onto other pellets at 77° F. and at 400° F. and measuring the broken fragments. Light and severe thermal shock were simulated by dropping the pellets at respective temperatures of 400° F. (for light shock) and 1,000° F. (for severe shock) into ice water and measuring the broken fragments. The coating applied was a pinewood resin salt emulsified asphalt having a penetration of about 3. The coating was applied at a level sufficient to give a residual asphalt coating of 0.20 percent by weight. After the initial treatments, the pellets were placed in No. 10 sieves in the sieve shaker, which was operated for 10 minutes, and the amounts passing the No. 10 and No. 325 screens were determined. These data are shown in table V.

TABLE V.—ROUGH HANDLING AND THERMAL SHOCK TESTS WITH COATED AND UNCOATED TACONITE PELLETS

| Treatment | Temp., ° F. | Pellets | | Breakage, wt. percent passing | |
|---|---|---|---|---|---|
| | | Uncoated | Coated | No. 10 | No. 325 |
| Rough handling (12-foot drop) | 77 | X | | 0.49 | 0.30 |
| | 77 | | X | 0.10 | 0.01 |
| | 400 | X | | 0.72 | 0.36 |
| | 400 | | X | 0.09 | |
| Light thermal shock plus abrasion test | 400–32 | X | | 0.27 | 0.21 |
| | 400–32 | | X | 0.29 | 0.04 |
| Severe thermal shock plus abrasion test | 1,000–32 | X | | 0.53 | 0.27 |
| | 1,000–32 | | X | 0.29 | 0.18 |

It may be noted that the asphalt emulsion coatings significantly reduced the breakage (as measured by weight percent passing No. 10 screen) as well as reducing dusting. The breakage reduction was particularly good in the rough handling and severe thermal shock tests.

The weight of the residual asphalt coating on the ore pellets was correlated with dust reduction and with free flow characteristics. From free flow tests, it was determined that asphalt residual should not exceed about 0.4 weight percent, preferably 0.3 weight percent. An optimum balance of free flow characteristics with dust reduction lies at about 0.2 weight percent coating. Thus, the preferred range of asphalt coating is from 0.1 to 0.3 percent by weight.

We claim:

1. A process for preventing dusting of metallic ore pellets which comprises coating said pellets after their formation when they are at a temperature in the range of from 200° to 750° F. with an emulsion of a bitumen in water, wherein said emulsion is applied in an amount sufficient to deposit a coating residue of from about 0.05 to 0.4% by weight relative to the pellets, and wherein the bitumen used to form said emulsion has an ASTM D-5-65 penetration at 77° F. not exceeding 100, and the solids content of the emulsion is from about 1 to 80 percent by weight.

2. The process of claim 1 in which the coating is carried out when the pellets are at a temperature of from 300° to 600° F.

3. The process of claim 1 in which the bitumen has a penetration in the range of 0 to 50.

4. The process of claim 3 in which the bitumen has a penetration in the range of 0-5.

5. The process of claim 1 in which the emulsifier used to form said emulsion of bitumen in water is anionic.

6. The process of claim 5 in which the emulsifier is a salt of a pinewood resin.

* * * * *